(12) United States Patent
Rohee

(10) Patent No.: US 6,641,215 B2
(45) Date of Patent: Nov. 4, 2003

(54) IRREVERSIBLE ADJUSTMENT MECHANISM AND A VEHICLE SEAT INCLUDING SUCH A MECHANISM

(75) Inventor: René Rohee, La Chapelle Biche (FR)

(73) Assignee: Faurecia Sieges d'automobile S.A., Nanterre (FR)

( * ) Notice: Subject to any disclaimer, the term of this patent is extended or adjusted under 35 U.S.C. 154(b) by 0 days.

(21) Appl. No.: 10/174,036

(22) Filed: Jun. 18, 2002

(65) Prior Publication Data
US 2002/0195859 A1 Dec. 26, 2002

(30) Foreign Application Priority Data
Jun. 21, 2001 (FR) .............................. 01 08190

(51) Int. Cl.[7] ................................. B60N 2/12
(52) U.S. Cl. ..................... 297/344.12; 297/361.1; 297/374; 192/223.2
(58) Field of Search ............. 297/344.12, 361.1, 297/374; 192/223.2, 44, 38

(56) References Cited

U.S. PATENT DOCUMENTS

| | | | | |
|---|---|---|---|---|
| 5,248,017 A | * | 9/1993 | Schwarzbich | ........ 297/361.1 X |
| 5,460,253 A | * | 10/1995 | Ritter et al. | ............ 297/374 X |
| 5,522,488 A | * | 6/1996 | Schwarzbich | ............. 192/38 X |
| 5,593,210 A | * | 1/1997 | Schwarzbich | ............ 297/361.1 |
| 5,794,479 A | * | 8/1998 | Schwarzbich | ............. 192/44 X |
| 5,896,973 A | * | 4/1999 | Hochmuth et al. | .. 297/361.1 X |
| 6,032,777 A | | 3/2000 | Denis | ....................... 192/233.2 |
| 6,206,164 B1 | * | 3/2001 | Kurita | ................. 192/223.2 X |
| 6,230,867 B1 | * | 5/2001 | Schwarzbich | ............. 192/223.2 |
| 6,273,233 B1 | | 8/2001 | Denis | ....................... 192/223.2 |
| 6,481,557 B2 | * | 11/2002 | Denis | ....................... 192/223.2 |
| 2003/0001418 A1 | * | 1/2003 | Baloche et al. | ........ 297/344.12 |

FOREIGN PATENT DOCUMENTS

| | | |
|---|---|---|
| DE | 37 34 363 A1 * | 4/1989 |
| DE | 41 29 617 A1 | 3/1992 |
| FR | 2 556 794 A1 | 6/1985 |
| FR | 2 766 773 A1 | 2/1999 |
| FR | 2 792 264 A1 | 10/2000 |
| JP | 2000300369 A | 10/2000 |

* cited by examiner

*Primary Examiner*—Rodney B. White
(74) *Attorney, Agent, or Firm*—Marshall, Gerstein & Borun LLP

(57) ABSTRACT

An irreversible adjustment mechanism comprising a casing, a pivotally-mounted lever urged resiliently towards a rest position, a pivotally-mounted intermediate member connected to the lever via a drive stage adapted to move the intermediate member only when the lever moves away from its rest position, a fixed ring, an outlet member co-operating with the ring to define hollow wedge-shaped spaces facing in opposite directions and receiving clamping bodies which are urged apart and which are flanked by two fingers that are part of the intermediate member. The casing comprises a base and a cover that are made of sheet metal and that are crimped together.

8 Claims, 2 Drawing Sheets

IRREVERSIBLE ADJUSTMENT MECHANISM AND A VEHICLE SEAT INCLUDING SUCH A MECHANISM

FIELD OF THE INVENTION

The present invention relates to irreversible adjustment mechanisms and to vehicle seats including such mechanisms.

More particularly, the invention relates to an irreversible adjustment mechanism comprising:

a casing itself comprising a base and a cover;

an inlet member mounted to pivot relative to the casing about a pivot axis, the inlet member being resiliently urged towards a rest position and being moveable in a first direction from the rest position, over a first angular sector, and in a second direction opposite from the first direction from the rest position, over in a second angular sector;

an intermediate member mounted to pivot about the pivot axis;

a drive stage connecting the inlet member to the intermediate member and adapted for:

positively driving the intermediate member with the inlet member via at least one drive member when the inlet member is moved away from its rest position; and moving the drive member with the inlet member when said inlet member is returned to its rest position, with the drive member rubbing against the intermediate member;

a blocking surface which is secured to the casing and which is circularly symmetrical about the pivot axis;

an outlet member which is mounted to pivot about the pivot axis and which is shaped to co-operate with the blocking surface to define at least one pair of wedged-shaped spaces comprising first and second hollow wedge-shaped spaces, the first and second wedged-shaped spaces diverging respectively in the first angular direction and in the second angular direction; and a locking stage connecting the intermediate member to the outlet member, said locking stage comprising:

at least one pair of clamping bodies comprising first and second rigid clamping bodies which are disposed in respective ones of the first and second wedge-shaped spaces and which are resiliently urged in respective ones of the first and second angular directions so as to become wedged between the outlet member and the blocking surface;

at least first and second rigid abutment faces secured to or integral with the intermediate member and which face in respective ones of the first and second angular directions, the first abutment face being adapted to abut against the first clamping body while releasing it when the intermediate member turns in the first angular direction, and the second abutment face being adapted to abut against the second clamping body while releasing it when the intermediate member turns in the second angular direction, the first and second abutment faces having a certain amount of angular clearance relative to the first and second clamping bodies; and at least first and second thrust faces which are secured to or integral with the outlet member, the first thrust face being adapted to limit the relative movement of the intermediate member relative to the outlet member in the first angular direction after said first abutment face has moved the first clamping body far enough to release it, so as then to cause said outlet member to be driven by the intermediate member, and the second thrust face being adapted to limit the relative movement of the intermediate member relative to the outlet member in the second angular direction after said second abutment face has moved the second clamping body far enough to release it, so as then to cause said outlet member to be driven by the intermediate member (in particular by direct contact with abutments of the intermediate member or by the clamping bodies abutting against the thrust faces when the abutment faces of the intermediate member move said clamping bodies).

BACKGROUND OF THE INVENTION

Document FR-A-2 792 264 describes such an irreversible adjustment mechanism.

That known mechanism makes it possible to make continuous adjustments to an element driven by a coupling shaft fitted in the outlet member, by effecting one or more back and forth "pumping" movements:

either over the first angular sector starting from the rest position of the inlet member, to displace the element driven by the outlet member in a certain direction;

or over the second angular sector, to move the element driven by the outlet member in the opposite direction.

For example, that mechanism can be used in particular to adjust the height of the seat proper of a vehicle seat.

That known mechanism is quite satisfactory, but it suffers from the drawback that the cover is fixed to the base of the casing by welding, which is relatively costly and can give rise to residual stresses and to uncontrolled deformations that are detrimental to the strength and to the proper operation of the mechanism.

OBJECTS AND SUMMARY OF THE INVENTION

A particular object of the present invention is to mitigate that drawback.

To this end, in the invention, in a mechanism of the type in question, the base of the casing is provided with an annular side wall which is fitted snugly around a rigid ring defining said blocking surface, the side wall of the casing being extended radially outwards by a collar adjacent to said rigid ring, and the cover of the casing being provided with an annular side wall that is crimped onto the collar of the base so as to prevent the cover and the base from moving relative to each other.

In preferred embodiments of the invention, any of the following provisions may optionally also be used:

the side wall of the cover forms two beads that project radially inwards, axially on either side of the collar of the base;

the side wall of the cover is provided with at least one inwardly-projecting projection that penetrates radially inwards into an indentation provided in the collar of the base;

the collar of the base is provided with an outside set of teeth disposed in contact with the side wall of the cover, so as to prevent the cover from turning relative to the base;

the first and second clamping bodies of each pair of clamping bodies are urged apart by a compression spring and they are flanked by a pair of axial fingers comprising first and second axial fingers that are secured to or integral with the intermediate member, the first and second axial fingers having respective ones of the first and second abutment faces, the first thrust face of the outlet member being adapted to abut against the second axial finger of the intermediate member when said intermediate member moves in a first angular direction, and the second thrust face of the outlet member being adapted to abut against the first axial finger of the intermediate member when said intermediate member moves in the second angular direction;

the drive stage comprises:

an abutment surface that is secured to or integral with the intermediate member, which abutment surface is circularly symmetrical about the pivot axis and, together with the inlet member, defines a hollow intermediate annular space, the inlet member being provided with at least one projection which projects into said intermediate annular space and which defines first and second wedged-shaped zones in said intermediate annular space, said first and second wedge-shaped zones diverging in respective ones of the first and second angular directions;

a pair of wedging bodies comprising first and second rigid wedging bodies which are disposed in the intermediate annular space and which are urged resiliently towards the first and second wedge-shaped zones of said intermediate annular space so as to be wedged between the projection of the inlet member and the abutment surface of the intermediate member, each of the first and second wedging bodies constituting a respective one of the above-described drive members; and at least one fixed axial finger which is secured to or integral with the support and which is disposed in said intermediate annular space, the projection of the inlet member being disposed facing the fixed axial finger when said inlet member is in its rest position; and the drive stage includes at least three pairs of wedging bodies, the first and second wedging bodies of each pair of wedging bodies being disposed on either side of a fixed axial finger and of a projection of the inlet member, the first wedging body of each pair of wedging bodies being held spaced apart from the second wedging body of an adjacent pair of wedging bodies by a compression spring.

In addition, the invention also provides a vehicle seat including an irreversible adjustment mechanism as defined above.

BRIEF DESCRIPTION OF THE DRAWINGS

Other characteristics and advantages of the invention appear from the following description of two of its embodiments, given by way of non-limiting example, and with reference to the accompanying drawings.

In the drawings.

MORE DETAILED DESCRIPTION

In the various figures, the same references are used to designate elements that are identical or similar.

Figure 1:
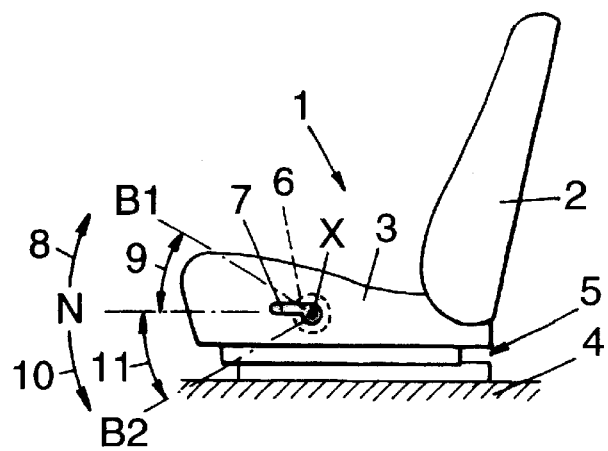
FIG. 1 is a diagrammatic view of a vehicle seat, in which the height of the seat proper is adjustable by means of an irreversible adjustment mechanism of the invention.

FIG. 1 shows a vehicle seat which comprises a seat back 2 carried by a seat proper 3 itself mounted on the floor 4 of the vehicle, e.g. by means of longitudinal runners 5.

The seat proper 3 is connected to the runners 5 via a raising mechanism that is known per se and that is not shown, making it possible to adjust the height of the seat proper 3. This raising mechanism is driven by an irreversible adjustment mechanism 6, itself driven by an actuating member such as a control lever 7 (or a handle of some other shape) mounted to pivot about a transverse horizontal pivot axis X.

The lever 7 is urged resiliently towards a rest position N in which said lever may, for example, be disposed substantially horizontally. Starting from this rest position, the lever 7 can be moved:

in a first angular direction 8, over a first angular sector 9 defined between the rest position N and a first abutment position B1; and in a second angular direction 10, over a second angular sector 11 defined between the rest position N and a second abutment position B2.

Figure 2:
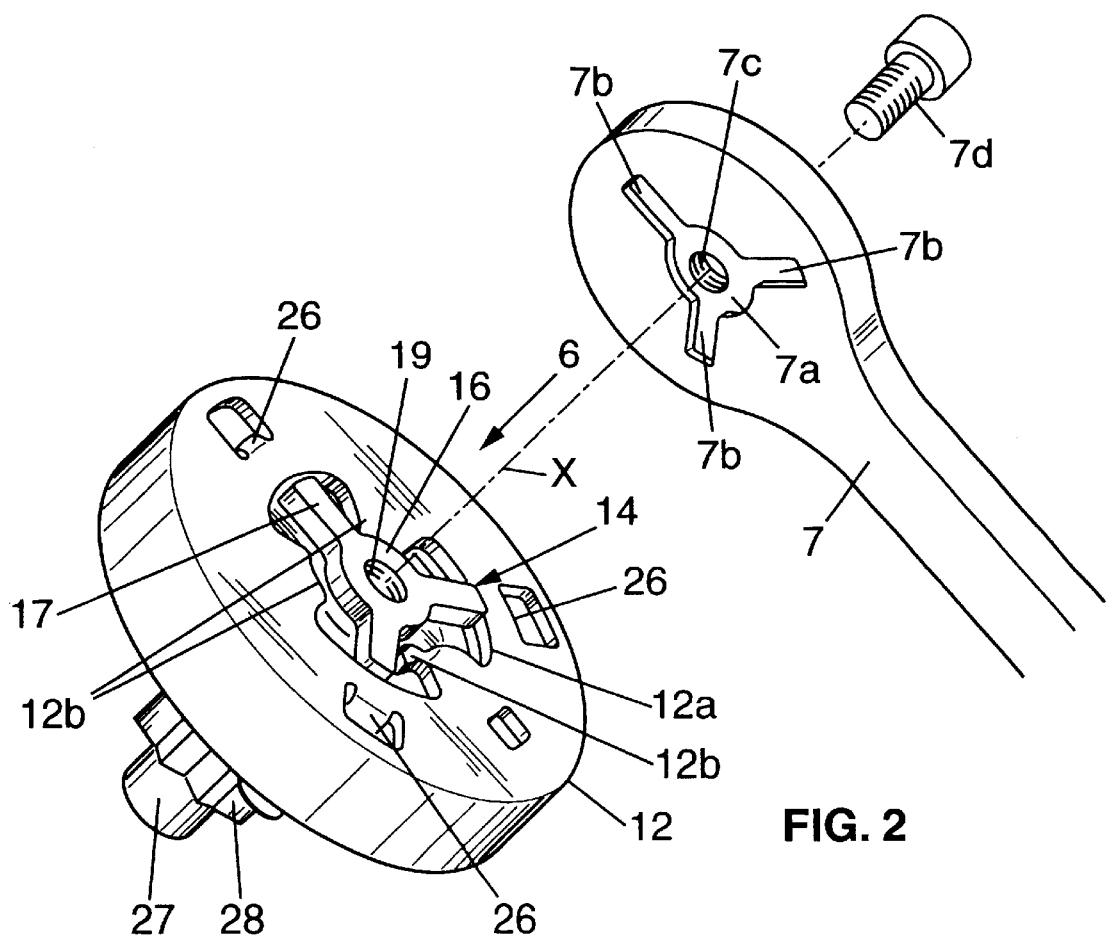
FIG. 2 is a perspective view of the irreversible adjustment mechanism for the seat of FIG. 1.
Figure 3:
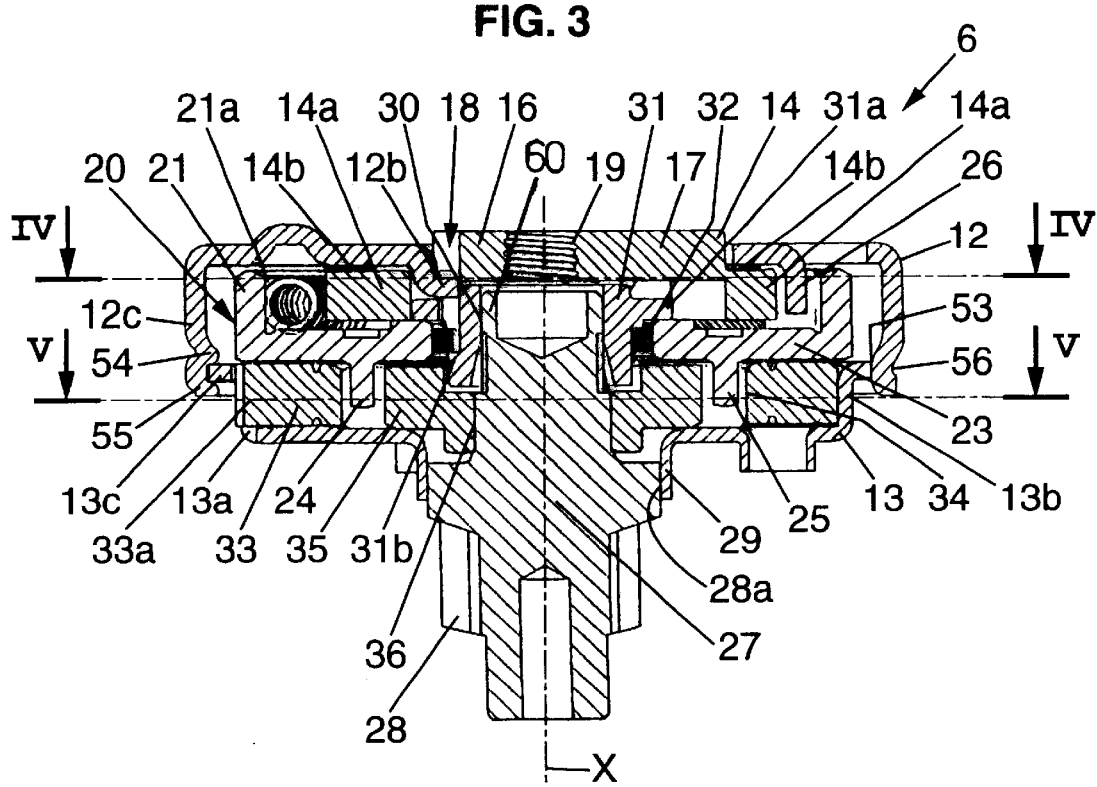
FIG. 3 is a cross-section view of the mechanism of FIG. 2.

As shown in FIGS. 2 and 3, the irreversible adjustment mechanism 6 has a casing made up of two sheet metal cheek plates 12, 13 respectively constituting a cover 12 and a base 13 that are assembled together.

Figure 4:
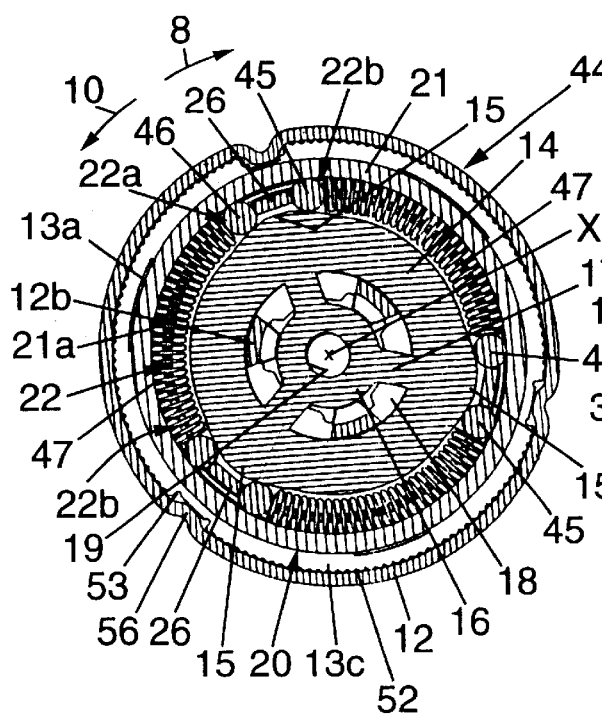
FIGS. 4 and 5 are section views respectively on line IV—IV and on line V—V of FIG. 3.

In addition, the adjustment mechanism further includes an inlet member 14 which may be a metal annular inlet cam whose outside shape is substantially triangular with rounded vertices constituting three projections 15 projecting radially outwards (see FIGS. 3 and 4).

The inlet member 14 is provided with a peripheral ring 14a which includes the projections 15 and which is connected to a central portion 16 centered on the axis X via three bridges 17 separated angularly from one another by three recesses 18. The central portion 16 of the inlet member 14 is provided with a tapped hole 19 which makes it possible to fix the above-mentioned lever 7.

Advantageously, to limit the friction between the inlet member 14 and the cover 12, a low-friction washer 14b made of plastic may optionally be interposed axially between the ring 14a of the inlet member and said cover 12.

As can be seen in FIGS. 2 and 3, the cover 12 is provided with a central recess 12a through which the central portion 16 and the bridges 17 of the inlet member 14 project, and said cover is further provided with catches 12b that project radially towards the central portion 16 of the inlet member 14, between the bridges 17, and that are folded back axially towards the inside of the casing through the recesses 18 in said inlet member.

The utility of these catches 12b is explained below.

Furthermore, the adjustment mechanism 6 further includes an intermediate metal member 20 or driver which is mounted to rotate about the axis X and which comprises a ring 21 centered on the pivot axis X (FIGS. 2 and 3. This ring 21 has an inside cylindrical surface or abutment cylindrical surface 21a that is circularly symmetrical about the axis X, and said ring 21 is disposed around the ring 14a of the inlet member.

Together with the inlet member, the abutment cylindrical surface 21a radially defines a hollow intermediate space 22 (see FIG. 3) which, on either side of each projection 15 on the inlet member, forms first and second wedge-shaped zones 22a, 22b that diverge in respective ones of the first and second directions 8, 10.

The intermediate member 20 has a base 23 formed integrally with the ring 21 on the side opposite from the cover 12, this base 23 further being provided with three pairs of axial fingers 24, 25. Each of these pairs of axial fingers comprises first and second axial fingers 24, 25 that extend towards the base 13 of the casing parallel to the axis X.

In the intermediate annular space 22, three fixed axial fingers 26 are disposed that may be constituted in particular by tongues cut out from the cover 12 of the casing and folded back axially towards the inside of said casing. When the mechanism 6 is in the rest position, the projections 15 of the inlet member 14 are disposed in register with respective ones of the three fixed axial fingers 26.

Figure 5:
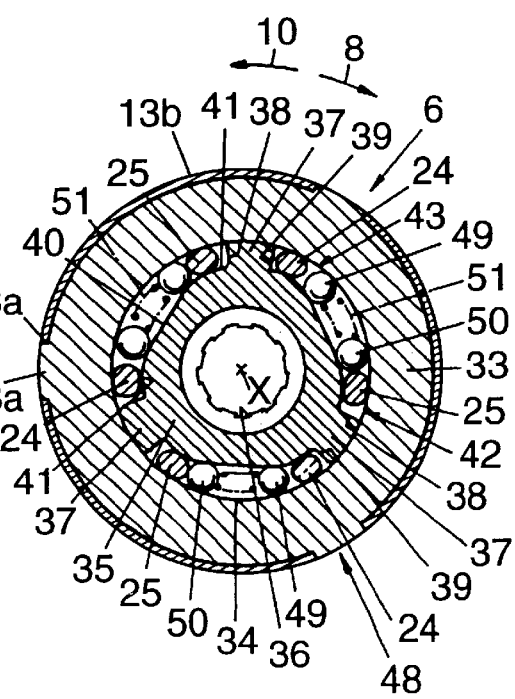

In addition, as shown in FIGS. 3 and 5, the adjustment mechanism 6 also includes a thick metal ring 33 secured to the base 13, which ring is interposed axially between the base 13 of the casing and the intermediate member 20. This ring 33 has an annular shape centered on the axis X, and it has an inside cylindrical surface 34 or blocking cylindrical surface that is circularly symmetrical about said axis X.

By way of non-limiting example, it is possible to secure said fixed ring 33 to the base 13 by means of projecting portions 33a that project radially outwards from the ring 33 and that fit into notches 13a provided in an annular side wall 13b of the base 13.

Advantageously, the side wall 13b of the base 13 is extended radially outwards by a collar 13c.

The collar may optionally be provided with an outside set of teeth 52, and it may advantageously be provided with indentations 53 projecting radially inwards, e.g. with three such indentations (see FIG. 4).

As can be seen in FIGS. 3 and 4, the annular side wall 12c of the cover 12 is advantageously crimped onto the collar 13c of the base 13.

More particularly, the side wall 12c of the cover is engaged over the collar 13c, preferably by forming two beads 54, 55 disposed axially on either side of said collar to fix the cover 12 axially to the base 13. In addition, the side wall 12c of the cover 12 is also pushed back radially inwards against the collar 13c so as to form inwardly-projecting projections 56 that penetrate into the indentations 53 in said collar, while preventing the cover 12 from turning relative to the base about the axis X. This prevention from turning about the axis X is supplemented by the outside set of teeth 52 on the collar rubbing against the side wall 12c of the cover and/or optionally by the teeth of the set of teeth 52 penetrating in part into said side wall.

Inside the fixed ring 33, an outlet member 35 or outlet cam is disposed that is internally provided with a fluted hole 36 or the like in which a coupling shaft 37 is force fitted, the coupling shaft being provided with a sprocket 28 for driving the raising mechanism making it possible to adjust the height of the seat proper 3 of the seat.

The outlet member 35 and the coupling shaft 27 are mounted to rotate about the axis X, the coupling shaft 27 being guided in rotation:

firstly by means of a first bearing formed by an axial neck 29 that is cylindrical and circularly symmetrical, that is centered on the axis X, and that is part of the base 13 of the casing, the neck 29 receiving substantially without any clearance a cylindrical bearing surface 28a formed at the periphery of the coupling shaft 27 in the vicinity of the sprocket 28; and secondly by a second bearing 31 formed in this example by a guide ring 31 that is made of plastic or of some other material, that is substantially cylindrical and circularly symmetrical about the axis X, and that is engaged by force between the catches 12b of the cover 12 of the casing so as to be secured to said casing, the guide ring 31 receiving a cylindrical bearing surface 30 formed at one end 60 of the coupling shaft 27 situated opposite from the sprocket 28.

Advantageously, the guide ring is further provided with a peripheral collar 31a that is disposed inside the ring 14a of the inlet member and that rests on the base 23 of the intermediate member.

In addition, an elastomer ring 32 may advantageously be engaged around the guide ring 31, which elastomer ring is clamped radially between said guide ring and a circular inside recess 23a in the base 23, centered on the axis X. The elastomer ring 32 serves to brake the intermediate member 20 relative to the casing 12, 13 so as to avoid random lost motion phenomena when actuating the mechanism 6, as explained in above-mentioned Document FR-2 792 264.

Advantageously, the elastomer ring 32 is retained around the guide ring 31 by means of three hooks 31b which are formed at the periphery of said guide ring facing the collar 31a, the elastomer ring 32 being disposed between said collar and said hooks.

It should be noted that, in the particular example shown in FIG. 3, the elastomer ring 32 is not in contact with the guide ring 31 at the hooks 31b, but the elastomer ring is in contact with said guide ring over all of the remainder of the periphery of said guide ring.

In addition, the outlet member 35 is externally provided with three radial fingers 37 which project outwards until they come into contact with the blocking cylindrical surface 34, and which are angularly spaced apart from one another by 120 degrees.

Each finger 37 is defined laterally by first and second thrust faces 38, 39 which face respectively in the second angular direction 10 and in the first angular direction 8.

The periphery of the outlet member 35 is also provided with three setback zones, each of which is in the form of a central flat 40 which, in the vicinity of the two adjacent projecting fingers 37, is extended by two rounded zones 41 having circular arcuate shapes substantially centered on the axis X. Together with the blocking cylindrical surface 34, each flat 40 defines first and second wedge-shaped spaces 42, 43 that diverge respectively in the first angular direction 8 and in the second angular direction 10.

The above-described mechanism 6 operates by means of the following:

a drive stage 44 (FIG. 4) which connects the inlet cam 14 to the intermediate member 20; and a locking stage 48 (FIG. 5) which connects the intermediate member 20 to the outlet cam 35.

As shown in FIG. 4, the drive stage 44 includes three pairs of first and second rigid wedging bodies 45, 46 which, in this example, are steel balls or rollers, disposed in respective ones of the intermediate annular spaces 22 in the first and second wedge-shaped zones 22a, 22b that are situated on either side of each projection 15 of the inlet member 14.

A compression spring 47 is interposed between each first wedging body 45 and the second wedging body 46 corresponding to the adjacent projection 15 of the inlet member, the compression spring also being received in the intermediate annular space 22, so as to urge the wedging body towards the wedge-shaped zones 22a, 22b.

Thus, when the actuating lever 7 is moved in either of the angular directions 8, 10 away from its rest position N, the projections 15 of the inlet body 14 block the first wedging bodies 45 hard against the abutment surface 21a when the lever is actuated in the first angular direction 8, and they block the second wedging bodies 46 against the abutment surface 21a when the lever is actuated in the second angular direction 10. The inlet member 14 then drives the intermediate member 20, after the lever 7 has traveled with a very small amount of angular lost motion, which lost motion may be about 1°. During this movement, every other wedging body remains in abutment against the fixed fingers 26.

When the user releases the lever 7 after each occasion on which it is actuated, said lever is returned to the rest position N by means of the springs 47 of the drive stage. During this return movement back towards the rest position, the wedging bodies 45, 46 that have been displaced by the inlet cam 14 return towards their initial positions with said inlet cam, while rubbing against the inside surface 21a of the ring 21. However, this rubbing does not induce any movement of the intermediate member 20 because of the presence of the elastomer ring 32.

It should be noted that the above-described drive stage may optionally be replaced by a ratchet drive mechanism, or by any other mechanism operating by back and forth motion of the lever 7.

Furthermore, as shown in FIG. 5, the locking stage 48 includes three pairs of first and second clamping bodies 49, 50 (e.g. steel balls or rollers) which are disposed in respective ones of the first and second wedge-shaped spaces 42, 43, and which are urged apart by compression springs 51 so that, in the rest position, the clamping bodies 42, 43 hold the outlet member 35 stationary by wedging against the blocking surface 34.

In addition, the first and second clamping bodies 49, 50 of each pair of clamping bodies that is disposed between two radial fingers 37 of the outlet cam are flanked by a pair of first and second axial fingers 24, 25 of the intermediate member 20, with some angular clearance.

More precisely:
  each first axial finger 24 is disposed between one of the first clamping bodies 49 and the corresponding second thrust face 39, said first finger 24 having a first abatement to move the corresponding first clamping body; and
  each second axial finger 25 is disposed between one of the second clamping bodies 50, and the corresponding first thrust face 38, said second finger 25 having a second abutment face adapted to move the corresponding second clamping body.

When the lever 7 is actuated by a user, and when it causes the intermediate member 20 to pivot as explained above, e.g. in the second angular direction 10 from its rest position N (i.e. over the second angular sector 11), the abutment face of each finger 25 of the intermediate member 20 moves the corresponding second clamping body 50 in the second angular direction 10, thereby releasing the second clamping body.

After the second clamping bodies 50 have been released, the first clamping bodies 49 urge the outlet member 35 in the angular direction 10 under the effect of the springs 51.

This urging may be sufficient to turn the outlet member 35, in particular when the mechanism 6 is operating empty, i.e. without being subjected to any opposing torque.

Conversely, when the mechanism 6 is operating under a load, the intermediate member 20 pivoting causes the outlet member 35 to turn in the angular direction 10 only when the first axial fingers 24 of the intermediate member 20 come into contact with the second thrust faces 39 of the outlet member.

At the end of actuation of the lever 7, when said lever returns towards its rest position N, the intermediate member 20 remains stationary as explained above, so that the outlet member 35 and the coupling shaft 27 remain stationary. If the user effects several "pumping" movements over the second angular sector 11, the outlet member 35 and the coupling shaft 27 are thus turned a plurality of times successively in the same angular direction 10.

The device would operate in the same way, mutatis mutandis, if the lever 7 were actuated repeatedly over the first angular sector 9.

What is claimed is:

1. An irreversible adjustment mechanism comprising:
  a casing itself comprising a base and a cover;
  an inlet member mounted to pivot relative to the casing about a pivot axis, the inlet member being resiliently urged towards a rest position and being moveable in a first direction from the rest position, over a first angular sector, and in a second direction opposite from the first direction from the rest position, over in a second angular sector;
  an intermediate member mounted to pivot about the pivot axis;
  a drive stage connecting the inlet member to the intermediate member and adapted for:
    positively driving the intermediate member with the inlet member via at least one drive member when the inlet member is moved away from its rest position; and
    moving the drive member with the inlet member when said inlet member is returned to its rest position with the drive member rubbing against the intermediate member;
  a blocking surface which is secured to the casing and which is circularly symmetrical about the pivot axis;
  an outlet member which is mounted to pivot about the pivot axis and which is shaped to co-operate with the blocking surface to define at least one pair of wedged-shaped spaces comprising first and second hollow wedge-shaped spaces, the first and second wedged-shaped spaces diverging respectively in the first angular direction and in the second angular direction; and
  a locking stage connecting the intermediate member to the outlet member, said locking stage comprising:
    at least one pair of clamping bodies comprising first and second rigid clamping bodies which are disposed in respective ones of the first and second wedge-shaped spaces and which are resiliently urged in respective ones of the first and second angular directions so as to become wedged between the outlet member and the blocking surface;
    at least first and second rigid abutment faces secured to or integral with the intermediate member and which face in respective ones of the first and second angular directions, the first abutment face being adapted to abut against the first clamping body while releasing it when the intermediate member turns in the first angular direction, and the second abutment face being adapted to abut against the second clamping body while releasing it when the intermediate member turns in the second angular direction, the first and second abutment faces having a certain amount of angular clearance relative to the first and second clamping bodies; and
    at least first and second thrust faces which are secured to or integral with the outlet member, the first thrust face being adapted to limit the relative movement of the intermediate member relative to the outlet member in the first angular direction after said first abutment face has moved the first clamping body far enough to release it, so as then to cause said outlet member to be driven by the intermediate member, and the second thrust face being adapted to limit the relative movement of the intermediate member relative to the outlet member in the second angular direction after said second abutment face has moved the second clamping body far enough to release it, so as then to cause said outlet member to be driven by the intermediate member;

wherein the base of the casing is provided with an annular side wall which is fitted snugly around a rigid ring defining said blocking surface, the side wall of the casing being extended radially outwards by a collar adjacent to said rigid ring, and the cover of the casing being provided with an annular side wall that is crimped onto the collar of the base so as to prevent the cover and the base from moving relative to each other.

2. A mechanism according to claim 1, in which the side wall of the cover forms two beads that project radially inwards, axially on either side of the collar of the base.

3. A mechanism according to claim 1, in which the side wall of the cover is provided with at least one inwardly-projecting projection that penetrates radially inwards into an indentation provided in the collar of the base.

4. A mechanism according to claim 1, in which the collar of the base is provided with an outside set of teeth disposed in contact with the side wall of the cover, so as to prevent the cover from turning relative to the base.

5. A mechanism according to claim 1, in which the first and second clamping bodies of each pair of clamping bodies are urged apart by a compression spring and they are flanked by a pair of axial fingers comprising first and second axial fingers that are secured to or integral with the intermediate member, the first and second axial fingers having respective ones of the first and second abutment faces, the first thrust face of the outlet member being adapted to abut against the second axial finger of the intermediate member when said intermediate member moves in a first angular direction, and the second thrust face of the outlet member being adapted to abut against the first axial finger of the intermediate member when said intermediate member moves in the second angular direction.

6. A mechanism according to claim 1, in which the drive stage comprises:

an abutment surface that is secured to or integral with the intermediate member, which abutment surface is circularly symmetrical about the pivot axis and, together with the inlet member, defines a hollow intermediate annular space, the inlet member being provided with at least one projection which projects into said intermediate annular space and which defines first and second wedged-shaped zones in said intermediate annular space, said first and second wedge-shaped zones diverging in respective ones of the first and second angular directions;

a pair of wedging bodies comprising first and second rigid wedging bodies which are disposed in the intermediate annular space and which are urged resiliently towards the first and second wedge-shaped zones of said intermediate annular space so as to be wedged between the projection of the inlet member and the abutment surface of the intermediate member, each of the first and second wedging bodies constituting a respective one of the above-described drive members; and at least one fixed axial finger which is secured to or integral with the support and which is disposed in said intermediate annular space, the projection of the inlet member being disposed facing the fixed axial finger when said inlet member is in its rest position.

7. A mechanism according to claim 6, in which the drive stage includes at least three pairs of wedging bodies, the first and second wedging bodies of each pair of wedging bodies being disposed on either side of a fixed axial finger and of a projection of the inlet member, the first wedging body of each pair of wedging bodies being held spaced apart from the second wedging body of an adjacent pair of wedging bodies by a compression spring.

8. A vehicle seat including an irreversible adjustment mechanism according to claim 1.

* * * * *